(12) United States Patent
Cano et al.

(10) Patent No.: US 7,808,707 B2
(45) Date of Patent: Oct. 5, 2010

(54) PROCESS FOR PRODUCING A TRANSPARENT OPTICAL ELEMENT, OPTICAL COMPONENT INVOLVED IN THIS PROCESS AND OPTICAL ELEMENT THUS OBTAINED

(75) Inventors: Jean-Paul Cano, Charenton-le-Pont (FR); Christian Bovet, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 603 days.

(21) Appl. No.: 11/173,898

(22) Filed: Jul. 1, 2005

(65) Prior Publication Data

US 2006/0006336 A1    Jan. 12, 2006

(30) Foreign Application Priority Data

Jul. 2, 2004    (FR) .................................. 04 07387
Dec. 17, 2004   (FR) .................................. 04 13537

(51) Int. Cl.
G02B 27/10    (2006.01)
G02F 1/03     (2006.01)
G02C 5/00     (2006.01)

(52) U.S. Cl. .......................... 359/619; 359/253; 351/41
(58) Field of Classification Search .................... 351/44, 351/49, 159, 163, 165–166, 172, 177; 359/253, 359/265, 272
See application file for complete search history.

(56) References Cited

U.S. PATENT DOCUMENTS

| | | | |
|---|---|---|---|
| 4,150,878 A * | 4/1979 | Barzilai et al. ............... 349/156 |
| 4,720,173 A * | 1/1988 | Okada et al. ................. 349/156 |
| 5,067,795 A | 11/1991 | Senatore ........................ 359/84 |
| 5,139,707 A | 8/1992 | Guglielmetti et al. ....... 252/586 |
| 5,233,038 A | 8/1993 | Guglielmetti et al. ......... 544/99 |
| 5,359,444 A * | 10/1994 | Piosenka et al. ............... 349/13 |
| 5,529,725 A | 6/1996 | Guglielmetti et al. ....... 252/586 |
| 5,576,870 A | 11/1996 | Ohmae et al. |
| 5,604,280 A | 2/1997 | Pozzo et al. ................. 524/110 |

(Continued)

FOREIGN PATENT DOCUMENTS

AU     779628     2/2005

(Continued)

OTHER PUBLICATIONS

David R. Lide, ed., CRC Handbook of Chemistry and Physics, 89$^{th}$ edition (internet version 2009), CRC Press/Taylor and Francis, Boca Raton, FL. pp. 10-12 through 10-13.

Primary Examiner—Scott J Sugarman
Assistant Examiner—Dawayne A Pinkney
(74) Attorney, Agent, or Firm—Occhiuti Rohlicek & Tsao LLP

(57) ABSTRACT

To produce a transparent optical element, the process starts with the production of an optical component having at least one transparent array of cells that are juxtaposed parallel to one surface of the component, each cell being hermetically sealed and containing a substance having an optical property. This optical component is then cut along a defined contour on its surface, corresponding to a predetermined shape of the optical element. Preferably, the array of cells constitutes a layer having a height of less than 100 μm perpendicular to the surface of the component.

29 Claims, 1 Drawing Sheet

U.S. PATENT DOCUMENTS

| | | |
|---|---|---|
| 5,733,077 A | 3/1998 | MacIntosh |
| 5,805,263 A | 9/1998 | Reymondet et al. |
| 5,807,906 A | 9/1998 | Bonvallot et al. ........... 522/182 |
| 6,019,914 A | 2/2000 | Lokshin et al. ............. 252/586 |
| 6,281,366 B1 | 8/2001 | Frigoli et al. ................. 549/59 |
| 6,307,243 B1 | 10/2001 | Rhodes |
| 6,327,072 B1 | 12/2001 | Comiskey et al. ........... 359/296 |
| 6,485,599 B1 | 11/2002 | Glownia et al. |
| 6,597,340 B1 | 7/2003 | Kawai ....................... 345/107 |
| 6,707,516 B1 | 3/2004 | Johnson et al. |
| 6,987,605 B2 * | 1/2006 | Liang et al. ................. 359/296 |
| 2002/0008898 A1 | 1/2002 | Katase |
| 2002/0140899 A1 | 10/2002 | Blum et al. ................. 351/159 |
| 2002/0167638 A1 | 11/2002 | Byun et al. |
| 2002/0176963 A1 | 11/2002 | Chen et al. .................. 428/156 |
| 2003/0035199 A1 | 2/2003 | Liang et al. |
| 2004/0008319 A1 | 1/2004 | Lai et al. ..................... 351/159 |
| 2004/0233381 A1 | 11/2004 | Kim et al. |

FOREIGN PATENT DOCUMENTS

| | | |
|---|---|---|
| CA | 2 340 672 | 12/2000 |
| DE | 197 14 434 | 10/1998 |
| FR | 2 718 447 | 10/1995 |
| WO | WO 02/01281 A2 | 1/2002 |
| WO | WO 03/012542 A1 | 2/2003 |
| WO | WO 03/077012 A2 | 9/2003 |

* cited by examiner

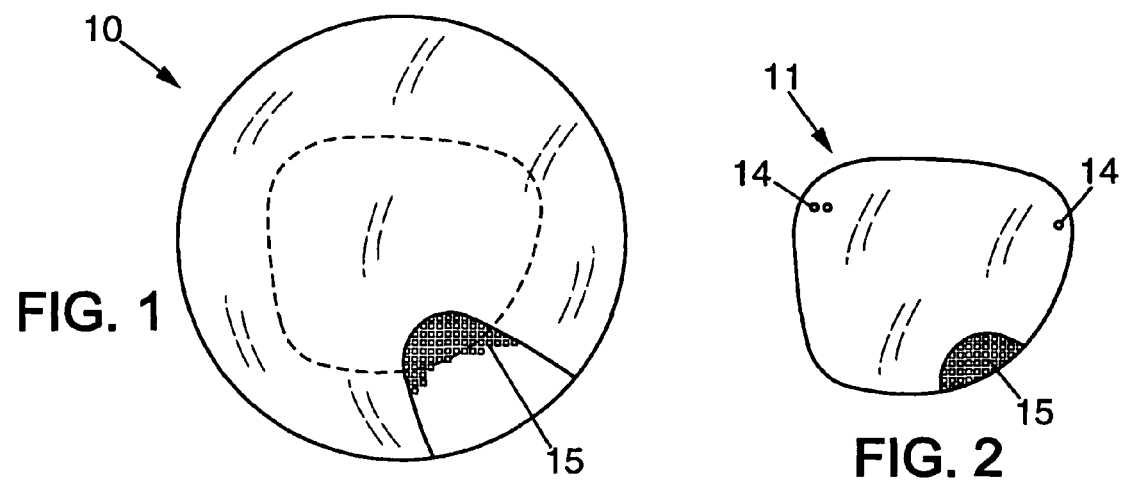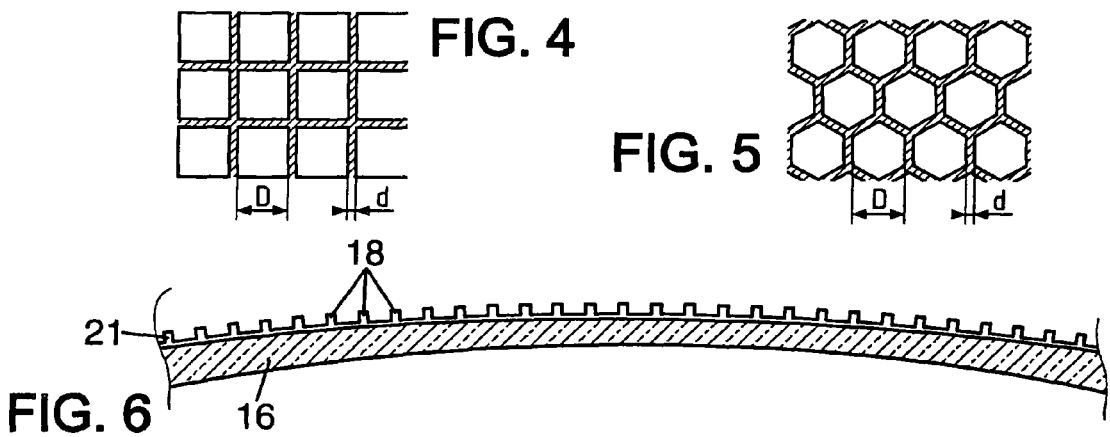

PROCESS FOR PRODUCING A TRANSPARENT OPTICAL ELEMENT, OPTICAL COMPONENT INVOLVED IN THIS PROCESS AND OPTICAL ELEMENT THUS OBTAINED

BACKGROUND OF THE INVENTION

The present invention relates to the production of transparent elements incorporating optical functions. It applies especially to the production of ophthalmic lenses having various optical properties.

Ametropia-correcting lenses are conventionally manufactured by the forming of a transparent material having a refractive index higher than that of air. The shape of the lenses is chosen so that the refraction at the material/air interfaces causes suitable focussing onto the retina of the wearer. The lens is generally cut so as to fit into a spectacle frame, with appropriate positioning relative to the pupil of the corrected eye.

It is known to vary the refractive index within the material of an ophthalmic lens, thereby making it possible to limit the geometrical constraints (see for example EP-A-0 728 572). This method was proposed above all for contact lenses. The index gradient is obtained for example by diffusion, selective irradiation or selective heating during the manufacture of the solid object constituting the lens. Although this provides for manufacture for each treatable case of ametropia, the method does not lend itself well to mass production. Otherwise, it is possible to manufacture, on an industrial scale, series of objects of graded index, to select that one which is closest to the one suitable for an eye to be corrected, and to carry out a re-forming operation on it, by machining and polishing, in order to adapt it to this eye. In this case, the need to carry out a re-forming operation on the lenses means that a great deal of the attraction of the method over the conventional methods is lost.

Patent Application U.S. 2004/0008319 proposes to modulate the refractive index parallel to the surface of a lens, such as a spectacle lens, using ink-jet heads of the kind employed in printers. These heads are controlled so as to deposit drops of solutions of polymers having different indices onto the surface of the object so as to obtain the desired variation of the index over the surface. The polymers are then solidified by irradiation or solvent removal. Control of the physical phenomena of interaction between the drops and the substrate, during both deposition and solidification, makes this method very difficult to put into practice. Furthermore, its use on a large scale is problematic since, here again, the index modulation is obtained during the manufacture of the solid object constituting the lens, and the subsequent customization assumes that a re-forming operation is carried out on the lens.

Another field of application of the invention is that of photochromic lenses. The structure of such a lens incorporates a layer whose light absorption spectrum depends on the light received. The photochromic dye of this layer is usually solid, although it is known that liquids or gels have superior properties, especially in terms of speed of reaction to the variations in luminosity.

Nevertheless, lenses are known in which the photosensitive dye is a liquid or a gel, spacers being provided in the thickness of the layer in order to define the volume occupied by the dye between adjacent transparent layers, with an impermeable barrier around the periphery of this volume. Such a lens is manufactured for a specific spectacle frame. It is not possible to cut the lens in order to fit it to another frame. It is also difficult to adapt it to the ametropia of a lens to be corrected.

It may also be beneficial to vary the light absorption parallel to the surface of the lens and/or to make this absorption dependent on the polarization of the light.

Among other types of ophthalmic lenses to which the invention may apply, mention may be made of active systems in which a variation in an optical property results from an electrical stimulus. This is the case of electrochromic lenses, or else lenses having variable refractive properties (see for example U.S. Pat. No. 5,359,444 or WO 03/077012). These techniques generally make use of liquid crystals or electrochemical systems.

Among these various types of lenses, or others that are not necessarily limited to ophthalmic optics, it would be desirable to be able to provide a structure that allows one or more optical functions to be introduced in a flexible and modular manner, while still maintaining the possibility of cutting the optical element obtained, with a view to incorporating it into a specified spectacle frame or one chosen elsewhere, or into any other means of holding said optical element in place.

One object of the present invention is to meet this requirement. Another object is to be able to produce the optical element on an industrial scale under appropriate conditions.

SUMMARY OF THE INVENTION

The invention thus proposes a process for producing a transparent optical element, comprising the following steps:
producing an optical component having at least one transparent array of cells that are juxtaposed parallel to one surface of the component, each cell being hermetically sealed and containing a substance having an optical property; and
cutting the optical component along a defined contour on said surface, corresponding to a predetermined shape of the optical element.

The cells may be filled with various substances chosen for their optical properties, for example those associated with their refractive index, their light absorptivity or polarization, their response to electrical or light stimuli, etc.

The structure therefore is adapted for many applications, particularly those involving variable optical functions. It implies dividing the surface of the optical element into discrete pixels, thereby offering great flexibility in the design, but also in the use of the element.

In particular, it is noteworthy that the optical component can be cut to the desired peripheral shapes, allowing it to be incorporated and fitted to various holding supports such as, for example, a spectacle frame or a helmet. The process may also include, without affecting the integrity of the structure, a step in which the optical component is drilled so as to fasten the optical element to its holding support.

The layer formed by the array of cells will advantageously have a height of less than 100 μm. According to various embodiments of the invention, this height is preferably between 10 μm and 50 μm, or between 1 μm and 10 μm. In particular, it may be equal to about 5 μm.

Within the context of the invention, the array of juxtaposed cells is preferably configured so that the fill factor τ, defined as the area occupied by the cells filled with the substance, per unit area of the component, is greater than 90%. In other words, the cells of the array occupy at least 90% of the area of the component, at least in a region of the component that is provided with the array of cells. Advantageously, the fill factor is between 90% and 99.5% inclusive, and even more preferably the fill factor is between 96% and 98.5% inclusive.

In order for the pixel structure not to cause undesirable diffraction effects, it is possible to make the dimensions of the cells so as to match the wavelengths of the spectrum of the light in question. The geometry of the array of cells is characterized by dimensional parameters that may in general relate to the dimensions of the cells parallel to the surface of the optical component, to their height corresponding to the height h of the walls separating them, and to the thickness d of these walls, measured parallel to the surface of the component. The dimensions of the cells parallel to the surface define the area σ of a cell. In the simple case where the cells are square with sides of length D (FIG. 4), this area is given by $\sigma = D^2$ and the fill factor τ is approximately given by $D^2/(D+d)^2$. The expressions for σ and τ are easily obtained for any other spatial organization of the cells.

The main source of defects in an array of cells may consist of the grid of walls. These walls are the source of a transparency defect of the optical component. In the meaning of the invention, an optical component is said to be transparent when an image observation through this optical component is perceived without significant contrast reduction, that is to say when an image formation through the optical component is obtained without impairing the image quality. Thus, the walls which separate the optical component cells interact with light, by diffracting this light. In the meaning of the invention, diffraction is defined as being the light spreading phenomenon which is observed when a luminous wave is materially bound ("Optique—Fondement et applications"—J. P. Pérez—Dunod—$7^{ème}$ édition—Paris 2004—Page 262). More specifically, the light energy impinging a wall is concentrated in a solid angle. Because of this, a light emitting point is no longer perceived as a point through an optical component which comprises such walls. This microscopic diffraction appears macroscopically like diffusion. This macroscopic diffusion, or incoherent diffusion, appears as a milky rendering of the pixellized structure of the optical component, and so as a contrast reduction of an image observed through the structure. This contrast reduction may be considered as a transparency reduction, as defined above. Such behaviour of macroscopic diffusion cannot be accepted for an optical element obtained from a pixellized optical component according to the invention, in particular for an ophthalmic lens which has to be transparent and should not incorporate any cosmetic defect which could impair the vision of the wearer of this lens. By dimensioning the cells judiciously, it is possible to reduce the diffracted energy for a given wavelength.

Thus, within the context of the invention, it will be possible to give the cells dimensions of greater than 1 μm parallel to the surface of the component. In particular, these cell dimensions parallel to the surface of the component may be between 5 μm and 100 μm. In the application to ophthalmic optics, it may be desirable to avoid excessively large cells, something which would give the surface of the lenses a visible texture. Advantageously, the cells may have a dimension of between 10 μm and 40 μm.

Parallel to the surface of the component, the cells will preferably be separated by walls with a thickness of between 0.10 μm and 5 μm. In a first embodiment of the invention, the walls have a thickness of between 0.10 μm and 5 μm, and preferably between 0.10 μm and 0.35 μm, so that they also produce virtually no undesirable diffractive effects in the visible spectrum. Such thin walls may provide a very high fill factor τ of the optical surface with the substance having a beneficial optical effect.

In a second embodiment, the walls have a thickness of between 0.40 μm and 2.00 μm. For example, this thickness may be equal to 1.00 μm. In a third embodiment, the walls have a thickness of between 2.00 μm and 3.5 μm, it being possible for example for this to be equal to 3.0 μm. The constituent material of the cell walls will be chosen in such a way that the cells will no longer be discernible from the material with which said cells are filled. The expression "not discernible" is understood to mean that there is no visible scattering, no visible diffraction and no parasitic reflections. In particular, this may be achieved in practice by suitably adjusting the refractive index and the absorption.

The array of cells may be formed directly on a rigid transparent substrate, or within a flexible transparent film that is subsequently transferred onto a rigid transparent substrate. Said rigid transparent substrate may be convex, concave or plane on that side which receives the array of cells.

In one method of implementing the process, the substance having an optical property contained in at least some of the cells is in the form of a liquid or gel. Said substance may especially have at least one of the optical properties chosen from coloration, photochromism, polarization and refractive index.

It may especially be in the form of a liquid or gel and it may incorporate a photochromic dye, thereby making it possible for a photochromic element with a very rapid response to be conveniently produced.

For the application to the manufacture of corrective lenses, it is necessary for different cells of the optical component to contain substances having a different refractive index. Typically, the refractive index will be adapted so as to vary over the surface of the component according to the estimated ametropia of an eye to be corrected.

For the application to the manufacture of optical lenses having a polarization optical property, the cells of the optical component will especially contain liquid crystals that may or may not be combined with dyes.

One subject of the present invention is also a process for producing an optical component as defined above, which comprises the formation, on a substrate, of a grid of walls for defining the cells parallel to said surface of the component, the collective or individual filling of the cells with the substance having an optical property in the form of a liquid or gel, and the closing of the cells on their opposite side from the substrate.

The array of cells of the optical component may include several groups of cells containing different substances. Likewise, each cell may be filled with a substance having one or more optical properties as described above. It is also possible to fill several arrays of cells over the thickness of the component. In this embodiment, the arrays of cells may have identical or different properties within each layer, or the cells within each array of cells may also have different optical properties. Thus it is possible to envisage having a layer in which the array of cells contains a substance for obtaining a refractive index variation and another layer or array of cells contains a substance having a photochromic property.

Another aspect of the invention relates to an optical component used in the above process. This optical component comprises at least one transparent array of cells that are juxtaposed parallel to one surface of the component. Each cell is hermetically sealed and contains a substance having an optical property. Preferably, the cells are separated by walls with a height of less than 100 μm, and may have dimensions of greater than 1 μm parallel to the surface of the component.

Yet another aspect of the invention relates to a transparent optical element, especially a spectacle lens, produced by cutting such an optical component.

BRIEF DESCRIPTION OF THE DRAWINGS

FIG. 1 is a front view of an optical component according to the invention;

FIG. 2 is a front view of an optical element obtained from this optical component;

FIG. 3 is a schematic sectional view of an optical component according to the invention;

FIGS. 4 and 5 are diagrams showing two types of lattice that can be used for arranging the cells in an optical component according to the invention;

FIGS. 6 and 7 are schematic sectional views showing this optical component at two stages of its manufacture; and FIG. 8 is a schematic sectional view illustrating another method of manufacturing an optical component according to the invention.

DETAILED DESCRIPTION OF THE INVENTION

The optical component 10 shown in FIG. 1 is a blank for a spectacle lens. A spectacle lens comprises an ophthalmic lens. The term "ophthalmic lens" is understood to mean a lens that is fitted to a spectacle frame in order to protect the eye and/or correct the sight, these lenses being chosen from afocal, unifocal, bifocal, trifocal and varifocal lenses.

Although ophthalmic optics is the preferred field of application of the invention, it will be understood that this invention is applicable to transparent optical elements of other types, such as for example lenses for optical instruments, filters, optical sight lenses, eye visors, optics for illumination devices, etc. Included within the invention in ophthalmic optics are ophthalmic lenses, but also contact lenses and ocular implants.

FIG. 2 shows a spectacle lens 11 obtained by cutting the blank 10 around a predefined outline, shown by the broken line in FIG. 1. In principle, this outline is arbitrary, provided that it falls within the extent of the blank. Mass-produced blanks can thus be used to obtain lenses that can be adapted so as to fit a large variety of spectacle frames. The edge of the cut lens may be trimmed without any problem, in a conventional manner, in order to give it a shape matched to the spectacle frame and to the method of fastening the lens to this spectacle frame and/or for aesthetic reasons. It is also possible to drill holes 14 into it, for example for receiving screws used to fasten it to the spectacle frame.

The general shape of the blank 10 may conform to industry standards, for example with a circular outline of 60 mm diameter, a convex front face 12 and a concave rear face 13 (FIG. 3). The conventional cutting, trimming and drilling tools may thus be used to obtain the lens 11 from the blank 10.

In FIGS. 1 and 2, the surface layers have been partially cut away so as to reveal the pixellated structure of the blank 10 and of the lens 11. This structure consists of an array of cells or microcavities 15 formed in a layer 17 of the transparent component (FIG. 3). In these figures, the dimensions of this layer 17 and of the cells 15 have been exaggerated relative to those of the blank 10 and its substrate 16 so as to make it easier to examine the drawing.

The lateral dimensions D of the cells 15 (parallel to the surface of the blank 10) are greater than 1 micron in order to avoid diffraction effects in the visible spectrum. In practice, these dimensions are between 10 μm and 100 μm. It follows that the array of cells can be produced using well-controlled technologies in the field of microelectronics and micromechanical devices.

It is therefore possible for the array of cells not to be visible on the lens 11 or on the blank 10.

According to the invention, the height h of the layer 17 that incorporates the array of cells 15 is preferably less than 100 μm, and more preferably between 1 μm and 10 μm inclusive. Advantageously, this height h is about 5 μm.

The walls 18 that separate the cells 15 ensure that they are sealed from one another. They have a thickness d of between 0.10 μm and 5.00 μm inclusive, in particular making it possible to obtain a high fill factor of the optical component. This wall thickness may for example be equal to about 0.35 μm. A high fill factor provides a high effectiveness of the desired optical function provided by the substance contained in the cells 15. This fill factor is between 90% and 99.5% inclusive, advantageously between 96% and 98.5% inclusive. By judiciously combining the lateral dimension (D) of the cells with the thickness (d) and height (h) of the walls separating the cells, it is possible to obtain an optical component having a high fill factor, which is not visible depending on the optical property or properties of the substances contained in said cells.

For example, with cells arranged in a square lattice (FIG. 4) or hexagonal lattice (FIG. 5), walls 18 with a thickness d=2 μm and pixels of dimension D=100 μm, only 4% of the area is absorbent ($\tau \approx 96\%$). For walls 18 with a thickness d=1 μm and pixels of dimension D=40 μm (or d=0.5 μm and D=20 μm), only about 5% of the area is absorbent ($\tau \approx 95\%$). The lower limit may be about $\tau = 90\%$.

The honeycomb or hexagonal-type lattice, shown in FIG. 5, is a preferred arrangement as it optimizes the mechanical strength of the array of cells for a given aspect ratio. However, within the context of the invention all possible lattice arrangements complying with a crystal geometry are conceivable. Thus, a lattice of rectangular, triangular or octagonal geometry can be produced. Within the context of the invention, it is also possible to have a combination of various geometrical lattice shapes in order to form the array of cells, while still respecting the dimensions of the cells as defined above.

The layer 17 incorporating the array of cells 15 may be covered with a number of additional layers 19, 20 (FIG. 3), as is usual in ophthalmic optics. These layers provide, for example, such functions as impact resistance, scratch resistance, coloration, antireflection, antifouling, etc. In the example shown, the layer 17 incorporating the array of cells is placed immediately on top of the transparent substrate 16, but it will be understood that one or more intermediate layers may be placed between them, such as layers providing impact resistance, scratch resistance or coloration functions.

Moreover, it is possible for several arrays of cells to be present in the multilayer stack formed on the substrate. It is thus possible, for example, for the multilayer stack to include, in particular, a layer incorporating arrays of cells containing a substance allowing the element to be provided with photochromic functions and another layer allowing the element to be provided with refractive-index-variation functions. These layers incorporating arrays of cells may also be alternated with additional layers as described above.

The various combinations are possible thanks in particular to the great flexibility of the process for producing the transparent optical element. Thus, within the context of the invention, the optical component may include an array of cells in which each cell is filled with a substance having one or more optical properties, or else in which the array of cells 15 includes several groups of cells containing different substances. The optical component may also consist of a stack comprising at least two layers incorporating an array of cells, each array of cells having identical optical properties, or each array of cells having different optical properties, or the cells within each array of cells having different optical properties.

The transparent substrate 16 may be made of glass or various polymer materials commonly used in ophthalmic optics. Among the polymer materials which can be used, one can cite, for information but in a non-limiting purpose, polycarbonate materials, polyamides, polyimides, polysulfons, copolymers of polyethylenterephtalate and polycarbonate, polyolefins, in particular polynorbornens, polymers and copolymers of diethylen glycol di(allylcarbonate), (meth) acrylic polymers and copolymers, in particular (meth)acrylic polymers and copolymers derived from A-bisphonol, thio (meth)acrylic polymers and copolymers, urethane and thiourethane polymers and copolymers, epoxy polymers and copolymers, and episulfide polymers and copolymers.

The layer 17 incorporating the array of cells is preferably located on its convex front face 12, the concave rear face 13 remaining free in order to undergo any re-forming operation, by machining and polishing, should this be necessary. However, if the transparent optical element is a corrective lens, the ametropia correction may be achieved by spatially varying the refractive index of the substances contained in the cells 15, which makes it possible to dispense with any rework on the rear face, and consequently providing greater flexibility in the design and/or the implementation of the various layers and coatings with which the lens has to be provided. The optical component may also be located on the concave face of a lens. Of course, the optical component may also be incorporated onto a plane optical element.

FIGS. 6 and 7 illustrate a first way in which the array of cells is produced on the substrate 16. The technique here is similar to those used for manufacturing electrophoretic display devices. Such techniques are described for example in documents WO 00/77570, WO 02/01281, U.S. 2002/0176963, U.S. Pat. No. 6,327,072 or U.S. Pat. No. 6,597,340. The array of cells can also be produced using fabrication processes deriving from microelectronics, well-known to those skilled in the art. By way of non-limiting illustration, mention may be made of the processes such as hot printing, hot embossing, photolithography, (hard, soft, positive or negative), microdeposition, such as microcontact printing, screen printing, or else ink-jet printing.

In the example in question, a film of a solution of radiation-curable, for example UV-curable, monomers is firstly deposited on the substrate 16. This film is exposed to ultraviolet radiation through a mask, which masks off the squares or hexagons distributed in a lattice and corresponding to the positions of the microcavities 15. By selective curing, the walls 18 standing up on top of a support layer 21 are left in place. The monomer solution is then removed and the component is in the state shown in FIG. 6.

To obtain a similar structure, another possibility is to use a photolithography technique. This starts with the deposition on the substrate 16 of a layer of material, for example a polymer, with a thickness of the order of the intended height for the walls 18, for example 5 μm or 20 μm. Next, a film of a photoresist is deposited on this layer, this film being exposed through a mask in the form of a grid pattern. The unexposed regions are removed upon developing the photoresist, in order to leave a mask aligned with respect to the positions of the walls, through which the layer of material is subjected to anisotropic etching. This etching, which forms the microcavities 15, is continued down to the desired depth, after which the mask is removed by chemical etching.

Starting from the state shown in FIG. 6, the microcavities 15 are filled with the substance having an optical property, in the liquid or gel state. A prior treatment of the front face of the component may optionally be applied in order to facilitate the surface wetting of the material of the walls and of the bottom of the microcavities. The solution or suspension forming the substance with an optical property may be the same for all the microcavities of the array, in which case it may be introduced simply by dipping the component into a suitable bath, using a process of the screen-printing type, a spin coating process, a process in which the substance is spread using a roller or a doctor blade, or else a spray process. It is also possible to inject it locally into the individual microcavities using an ink-jet head.

The latter technique will typically be adopted when the substance with an optical property differs from one microcavity to another, several ink-jet heads being moved over the surface in order to fill the microcavities in succession.

However, especially in the case in which the microcavities are formed by selective etching, another possibility is firstly to hollow out a group of microcavities, to collectively fill them with a first substance, and then to close them off, the rest of the surface of the component remaining masked during these operations. Next, the selective etching is repeated through a resist mask covering at least the regions of microcavities that have already been filled, in addition to the wall regions, and the new microcavities are filled with a different substance and then closed off. This process may be repeated one or more times if it is desired to distribute different substances over the surface of the component.

To hermetically seal an array of filled microcavities, an adhesive-coated plastic film is for example applied, this being thermally welded or hot-laminated onto the top of the walls 18. It is also possible to deposit onto the region to be closed off a curable material in solution, this material being immiscible with the substance having an optical property contained in the microcavities, and then to cure this material, for example using heat or irradiation.

Once the array of microcavities 15 has been completed (FIG. 7), the component may receive the additional layers or coatings 19, 20 in order to complete its manufacture. Components of this type are mass produced and then stored, to be taken up again later and individually cut according to the requirements of a customer.

If the substance having an optical property is not intended to remain in the liquid or gel state, a solidification treatment may be applied to it, for example a heating and/or irradiation sequence, at an appropriate stage after the moment when the substance has been deposited.

In a variant shown in FIG. 8, the optical component consisting of an array of microcavities 25 is constructed in the form of a flexible transparent film 27. Such a film 27 can be produced by techniques similar to those described above. In this case, the film 27 can be produced on a plane substrate, i.e. one that is not convex or concave.

The film 27 is for example manufactured on an industrial scale, with a relatively large size, in order to make savings in the combined execution of the steps of the process, and then it is cut to the appropriate dimensions in order to be transferred onto the substrate 16 of a blank. This transfer may be carried out by adhesively bonding the flexible film, by thermoforming the film, or even by a physical adhesion effect in a vacuum. The film 27 may then receive various coatings, as in the previous case, or may be transferred onto the substrate 16 which is itself coated with one or more additional layers as described above.

In one field of application of the invention, the optical property of the substance introduced into the microcavities 15 is its refractive index. The refractive index of the substance is varied over the surface of the component in order to obtain a corrective lens. In a first embodiment of the invention, the variation may be produced by introducing substances of different indices during the manufacture of the array of microcavities 15.

In another embodiment of the invention, the variation may be achieved by introducing into the microcavities 15 a substance whose refractive index may be subsequently adjusted by irradiation. The writing of the corrective optical function is then carried out by exposing the blank 10 or the lens 11 to light whose energy varies over the surface in order to obtain the desired index profile, so as to correct the vision of a patient. This light is typically that produced by a laser, the writing equipment being similar to that used for etching CD-ROMs or other optical memory media. The greater or lesser exposure of the photosensitive substance may result from a variation in the power of the laser and/or of the choice of the exposure time.

Among the substances that can be used in this application, mention may be made, for example, of mesoporous materials and liquid crystals. The liquid crystals may be frozen by a polymerization reaction, for example one induced by irradiation. Thus, they may be frozen in a chosen state in order to introduce a predetermined optical retardation in the lightwaves that pass through them. In the case of a mesoporous material, the refractive index of the material is controlled through the variation in its porosity. Another possibility is to use photopolymers that have the well-known property of changing its refractive index over the course of the irradiation-induced curing reaction. These index changes are due to a modification of the density of the material and to a change in the chemical structure. It will be preferable to use photopolymers that undergo only a very small volume change during the polymerization reaction.

The selective polymerization of the solution or suspension is carried out in the presence of radiation that is spatially differentiated with respect to the surface of the component, so as to obtain the desired index variation. This variation is determined beforehand according to the estimated ametropia of a patient's eye to be corrected.

In another application of the invention, the substance introduced in liquid or gel form into the microcavities has a photochromic property. Among the substances used in this application, mention may be made, by way of examples, of photochromic compounds containing a central unit such as a spirooxazine, spiro-indoline-[2,3']benzoxazine, chromene, spiroxazine homoazaadamantane, spirofluorene-(2H)-benzopyrane or naphtho[2,1-b]-pyrane core such as those described in particular in the Patents and Patent Applications FR 2 763 070, EP 0 676 401, EP 0 489 655, EP 0 653 428, EP 0 407 237, FR 2 718 447, U.S. Pat. No. 6,281,366 and EP 1 204 714.

Within the context of the invention, the substance having an optical property may also be a dye, or a pigment capable of modifying the degree of transmission.

The invention claimed is:

1. A transparent optical component selected from a lens, an eye visor or an ocular implant, comprising at least one transparent array of cells that are juxtaposed parallel to one surface of the component, each individual cell being hermetically sealed apart from the other cells and containing a substance having an optical property, wherein the array of cells has a fill factor τ of greater than 90%, parallel to the surface of the component, where the fill factor τ is defined as the area occupied by the cells filled with substance per unit area of the optical component.

2. The optical component according to claim 1, wherein the array of cells constitutes a layer having, perpendicular to said surface, a height of less than 100 μm.

3. The optical component according to claim 2, wherein the layer formed by the array of cells has a height of between 10 μm and 50 μm.

4. The optical component according to claim 2, wherein the layer formed by the array of cells has a height of between 1 μm and 10 μm.

5. The optical component according to claim 4, wherein the layer formed by the array of cells has a height of about 5 μm.

6. The optical component according to claim 1, which comprises a rigid transparent substrate on which the array of cells is formed.

7. The optical component according to claim 1, which comprises a rigid transparent substrate onto which a transparent film incorporating the array of cells is transferred.

8. The optical component according to claim 6, wherein the rigid transparent substrate is convex, concave or plane on that side which has the array of cells.

9. The optical component according to claim 1, wherein the substance having an optical property contained in at least certain of the cells is in the form of a liquid or gel.

10. The optical component according to claim 1, wherein the optical property is chosen from a coloration, photochromism, polarization or refractive-index property.

11. The optical component according to claim 1, wherein different cells contain substances having a different refractive index.

12. The optical component according to claim 11, wherein the substances having a different refractive index are photopolymers, liquid crystals or mesoporous materials.

13. The optical component according to claim 1, wherein the array of cells includes several groups of cells containing different substances.

14. The optical component according to claim 1, wherein several arrays of cells are stacked on the thickness of said component.

15. The optical component according to claim 14, wherein each array of cells has identical optical properties, or each array of cells has different optical properties, or the cells within each array of cells have different optical properties.

16. The optical component according to claim 1, wherein the fill factor is between 90% and 99.5% inclusive.

17. The optical component according to claim 1, wherein the cells of the array are arranged in a hexagonal-type lattice.

18. The optical component according to claim 1, wherein the cells have dimensions of greater than 1 μm parallel to the surface of the component.

19. The optical component according to claim 18, wherein the cells have a dimension of between 5 μm and 100 μm parallel to the surface of the component.

20. The optical component according to claim 17, wherein the cells have a dimension of between 10 μm and 40 μm parallel to the surface of the component.

21. The optical component according to claim 1, wherein the cells are separated by walls having dimensions of between 0.10 μm and 5 μm parallel to the surface of the component.

22. The optical component according to claim 21, wherein the cells are separated by walls having dimensions of between 0.10 μm and 0.40 μm parallel to the surface of the component.

23. The optical component according to claim 22, wherein the walls have dimensions of less than 0.35 μm.

24. The optical component according to claim 21, wherein the cells are separated by walls made of a material that does not reflect light and have dimensions of between 0.40 μm and 3.00 μm.

25. The optical component according to claim 24, wherein the walls have dimensions of between 0.40 μm and 1.00 μm.

26. A spectacle lens, comprising the optical component of claim 1, wherein the lens is produced by cutting the optical component.

27. Spectacle lens according to claim 26, wherein at least one hole is drilled through the lens in order to fasten the lens to a spectacle frame.

28. Spectacle lens according to claim 26, wherein the optical property of the substance contained in the cells is adapted in order to vary over the surface of the lens as a function of the estimated ametropia of an eye to be corrected.

29. Spectacle lens according to claim 26, wherein the substance contained in the cells is a photochromic substance.

* * * * *